United States Patent [19]

Hildinger

[11] 4,007,661
[45] Feb. 15, 1977

[54] GEAR CUTTING MACHINE
[75] Inventor: Otto Hildinger, Schwerzenbach, Switzerland
[73] Assignee: Werkzeugmaschinenfabrik Oerlikon-Bührle AG, Zurich, Switzerland
[22] Filed: June 2, 1975
[21] Appl. No.: 582,749
[30] Foreign Application Priority Data
June 7, 1974 Switzerland .................. 7793/74
[52] U.S. Cl. .................................. 90/5; 90/9.4
[51] Int. Cl.² .................................. B23F 9/10
[58] Field of Search .................. 90/5, 9.4, 3
[56] References Cited
UNITED STATES PATENTS
2,792,764  5/1957  Carlsen et al. .................. 90/5
3,464,312  9/1969  Takahashi et al. .................. 90/5

Primary Examiner—Gil Weidenfeld
Attorney, Agent, or Firm—Werner W. Kleeman

[57] ABSTRACT

A gear cutting machine comprising a tool rotating about a first axis, the first axis being rotatable about a second axis at a first cone-shaped shell or cone, the second axis being rotatable about a second cone-shaped shell or cone about a third axis. There is further provided a gear drive possessing two pairs of bevel gears. The cone apex-cone angles of the bevel gears of one pair of bevel gears are of the same magnitude as the cone apex-cone angles of the bevel gears of the other pair of bevel gears, such cone angles are obtuse, and both of the pairs of bevel gears are connected with one another through the agency of a pair of spur gears.

6 Claims, 1 Drawing Figure

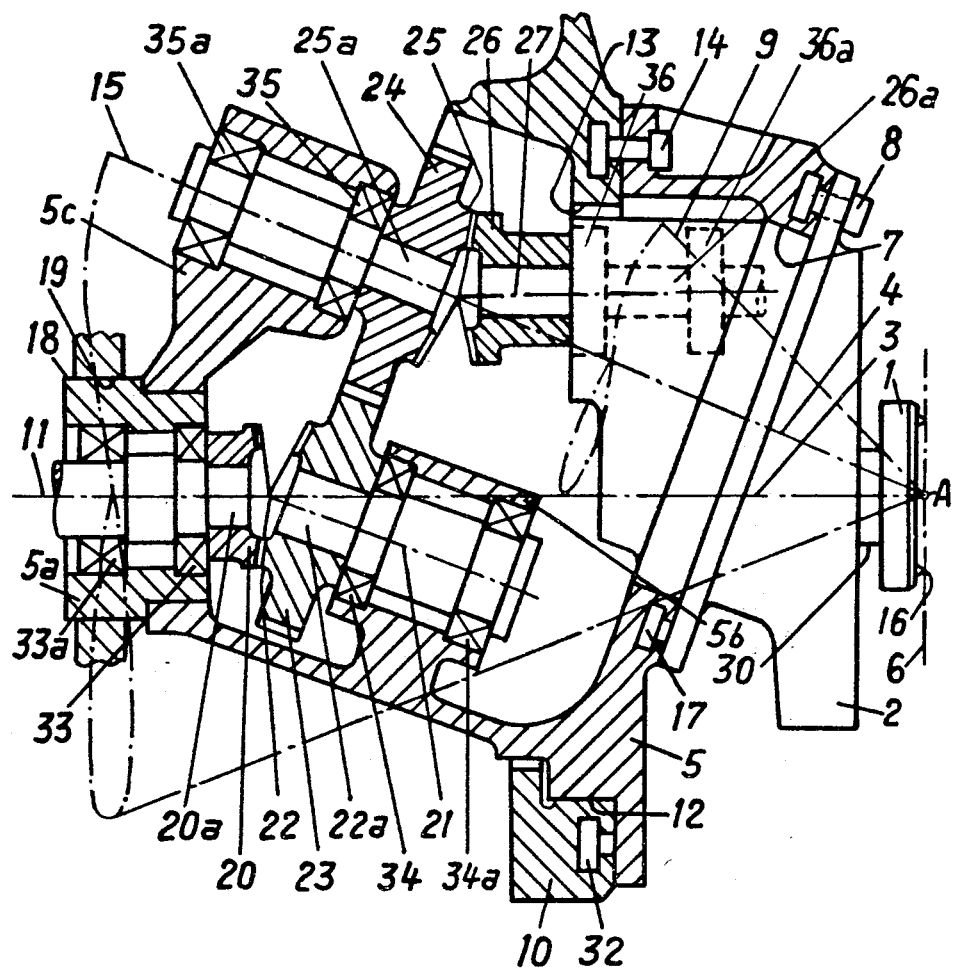

GEAR CUTTING MACHINE

BACKGROUND OF THE INVENTION

The present invention relates to a new and improved construction of a gear cutting machine of the type comprising a tool rotating about a first axis, this first axis being pivotable about a second axis along a first cone-shaped shell or cone, the second axis being pivotable about a second cone-shaped shell or cone about a third axis, there further being provided a gear drive possessing two pairs of bevel gears, the first axis being operatively connected by means of the gear drive via the second axis with the third axis.

A gear cutting machine of this type has been disclosed in U.S. Pat. No. 2,792,764, granted May 21, 1957 and corresponding to German patent 924,303, published Feb. 28, 1955, the disclosure of which is incorporated herein by reference, wherein the axis of rotation of the tool likewise is pivotable at an imaginary cone-shaped shell or cone about a second axis. This pivotal movement occurs by rotating a support body or carrier in a head. The second axis is likewise pivotable at a second cone-shaped shell or cone about a third axis, this pivotal motion occurring by adjusting the head in a headstock. The first axis is connected via the second axis with the third axis through the agency of a gear drive. The gear drive possesses two pairs of bevel gears. One pair of bevel gears consists of bevel gears possessing an obtuse-angle cone apex, the other pair of bevel gears consists of bevel gears possessing an acute-angle cone apex. A drawback of this prior art apparatus resides in the fact that the fabrication and assembly of the gear drive is complicated and expensive, since two different pairs of bevel gears are employed. Furthermore, a large checking machine is necessary in order to check the acute-angle bevel gears. The acute-angle bevel gears incorporate fewer teeth which are simultaneously in running mesh than the obtuse-angle bevel gears, so there is present a poorer meshing of both bevel gears and the longevity of the gears is markedly reduced.

SUMMARY OF THE INVENTION

It is a primary object of the present invention to provide an improved construction of gear cutting machine which is not associated with the aforementioned drawbacks and limitations of the prior art machine discussed above.

A further and more specific object of the invention aims at the provision of a novel construction of gear cutting machine which simplifies the production and assembly thereof and permits the use of a less expensive gearing or gear drive for a machine tool of the aforementioned type.

Now in order to implement these and still further objects of the invention, which will become more readily apparent as the description proceeds, the gear cutting machine of this development is manifested by the features that the cone apex-cone angles of the bevel gears of one pair of bevel gears are of the same magnitude as the cone apex-cone angles of the bevel gears of the other pair of bevel gears, that such cone angles are obtuse, and both pairs of bevel gears are operatively interconnected with one another via a pair of spur gears.

By virtue of the fact that both pairs of bevel gears are constituted by bevel gears having the same cone angles, and wherein all cone angles are obtuse, there is significantly simplified both the fabrication as well as the assembly of the gear or gearing drive.

BRIEF DESCRIPTION OF THE DRAWING

The invention will be better understood and objects other than those set forth above, will become apparent when consideration is given to the following detailed description thereof. Such description makes reference to the annexed drawing wherein in the single FIGURE there is illustrated an exemplary embodiment of the inventive apparatus.

DETAILED DESCRIPTION OF THE INVENTION

Describing now the drawing, it is to be understood that only enough of the structure of the gear cutting machine of this development has been conveniently illustrated in the drawing to enable those skilled in the art to readily understand the underlying concepts of this development and the improvement to which this particular invention pertains. As to structure not directly dealing with the improvement aspects of this invention and for further background details of the gear cutting machine reference may be had to the aforementioned prior art patents, the disclosure of which is incorporated herein by reference. Hence, according to the drawing an end cutter head 1 or other appropriate gear cutter tool is rotatably mounted in conventional manner about a first axis 3 through the agency of a cutter head spindle 30 in a carrier or support body 2. This carrier or support body 2 is rotatably mounted about a second axis 4 in a head 5, wherein the mounting thereof takes place in a bore 7 of the head 5 which is substantially coaxially arranged with respect to the axis 4. The position of the carrier or support body 2 relative to the head 5 is fixed by screws 8 or equivalent structure, the heads of which protrude into a substantially T-shaped peripheral groove 17 provided in the head 5. The second axis 4 is inclined through an angle of 15° with respect to the first axis 3. Upon rotation of the support body or carrier 2 in the head 5 the first axis 3 forms an imaginary cone-shaped shell or cone 9 about the second axis 4. The apex or tip of the cone-shaped shell or cone 9 is located at point A in an apex or tip plane 6 of the tool in which there are located the tips of individual cutters or cutter blades 16 of the end cutter head 1.

The head 5 is rotatably mounted about a third axis 11 in a further headstock 10 which has only been partially illustrated in the drawing, the mounting occurring through the agency of a cylindrical surface 12 of the head 5 and by means of a cylindrical surface 18 at a portion 5a of the head 5 in bores 13 and 19 of the headstock 10. The portion 5a of the head 5 is rigidly connected with such head 5. The cylindrical surface 12 only extends over a portion of the periphery.

The position of the head 5 in the headstock 10 is secured by screws 14 or equivalent structure, the heads of which protrude or extend into a substantially T-shaped peripheral groove 32 in the headstock 10. Upon rotation of the head 5 in the headstock 10 the second axis 4 forms an imaginary cone-shaped shell or cone 15 about the third axis 11, the apex of which is likewise located at the point A. In the position illustrated in the drawing the first axis 3 and third axis 11 coincide. The drive of the end cutter head 1 occurs through the agency of a gearing or gear drive.

A first bevel gear 20 is secured to a shaft 20a which is rotatably mounted about the third axis 11 via the bearings 33, 33a in the portion 5a of the head 5. The first bevel gear 20 meshes with a second bevel gear 22, this second bevel gear 22 being secured to a shaft 22a. The shaft 22a is rotatably mounted about an axis 21 via the bearings 34, 34a in a housing 5b of the head 5. The axis 21 is essentially parallel to the second axis 4. The second bevel gear 22 is formed of one-piece with a first spur gear 23, the axis of rotation of which likewise is constituted by the axis 21. The first spur gear 23 meshes with a second spur gear 24. The second spur gear 24 is fabricated of one-piece with a third bevel gear 25 and is secured to a shaft 25a, which shaft 25a is rotatably mounted about the second axis 4 in a housing 5c of the head 5 via the bearings 35, 35a. The third bevel gear 25 drives a fourth bevel gear 26 which is secured at a shaft 26a which is rotatably mounted in the support body or carrier 2 about an axis 27 via the bearings 36, 36a. The axis 27 is essentially parallel to the first axis 3. The shaft 26a and the cutter head spindle 30 are operatively interconnected with one another internally of the support body or carrier 2 via a not particularly illustrated but conventional spur gear drive.

All of the bevel gears 20, 22, 25, 26 possess the same parameters, such as modulus, diameter, pitch, pressure angle and so forth, and the cone angles of such bevel gears are obtuse. The bevel gears 20, 22, 25, 26 and the spur gears 23, 24 together with their bearings 33, 33a, 34, 34a, 35, 35a, 36, 36a form two respective similar gear units or assemblies 20, 33, 33a and 26, 36, 36a and 22, 23, 34, 34a and 24, 25, 35, 35a, respectively.

The mode of operation of the described apparatus will be apparent from the drawing and is as follows:

By rotating the support body or carrier 2 in the head 5, wherein the first axis 3 is moved along the first cone-shaped shell or cone 9, the first axis 3 together with the third axis 11 can form any random angle between null and an angle which is twice as large as that between the first axis 3 and the second axis 4, in the embodiment under discussion between 0° and 30°. In other words, the apex or tip plane 6 of the end cutter head 1 can be tilted out of the illustrated position through a random angle, however at a maximum through 30°. Due to pivoting of the head 5 in the headstock 10 it is possible to rotate and adjust the plane of the tilt or pivot angle, i.e. the plane formed by the axes 3 and 11, about the third axis 11.

Upon adjusting the support body or carrier 2 relative to the head 5 the fourth bevel gear 26 rolls-off at the third bevel gear 25 until there has been attained and fixed the desired position of the support body or carrier 2. During adjustment of the head 5 relative to the headstock 10 the second bevel gear 22 rolls-off at the first bevel gear 20 until there is attained and fixed the desired position of the head 5. Both during adjustment of the support body or carrier 2 as well as also during pivoting of the head 5 both of the bevel gear pairs 20, 22 and 25, 26 and the spur gear pair 23, 24 remain in continuous meshing engagement.

By virtue of the fact that the gear drive between the first axis 3 and the third axis 11 possess two respective exchangeable similar gear units 20, 33, 33a and 26, 36, 36a and 22, 23, 34, 34a and 24, 25, 35, 35a, respectively, and all of the bevel gears 20, 22, 25, 26 beneficially have the same parameters, the gear drive is significantly simplified and rendered less expensive. There is avoided the need to fabricate bevel gears having acute cone angles. Even if the spur gears interconnecting both of the pairs of bevel gears are not in better meshing engagement than bevel gears with acute cone angles, nonetheless they are considerably less expensive to make and are not associated with any particular problems during the manufacture thereof.

While there is shown and described present preferred embodiments of the invention, it is to be distinctly understood that the invention is not limited thereto, but may be otherwise variously embodied and practiced within the scope of the following claims.

Accordingly, I claim:

1. In a gear cutting machine comprising a support body, a tool means mounted in the support body and rotatable about a first axis, a head in which there is mounted the support body for angular adjustment about a second axis such that the first axis is movable along a first imaginary cone-shaped shell about the second axis, a headstock in which there is mounted the head for angular adjustment about a third axis in such a manner that the second axis is movable on a second imaginary cone-shaped shell about the third axis, a gear train for driving said tool means, said gear train including two pairs of bevel gears, the cone apex- cone angles of the bevel gears of one pair being equal to the cone apex- cone angles of the bevel gears of the other pair, said cone angles being obtuse, and a pair of spur gears drivingly interconnecting both of the pairs of bevel gears, and said second axis coinciding with the axis of one of said bevel gears in one pair of said bevel gears and said third axis coinciding with the axis of one of said bevel gears in the other pair of said bevel gears, whereby the gear train operatively interconnects the first axis via the second axis with the third axis.

2. The gear cutting machine as defined in claim 1, wherein the cone apex-cone angles of the bevel gears of one pair of bevel gears are of the same magnitude.

3. The gear cutting machine as defined in claim 1, further including bearings for the mounting of said gears, and wherein the four bevel gears of both pairs of bevel gears and the two spur gears of the pair of spur gears together with the bearings of said gears form four gear units, and each two gear units are the same and exchangeable.

4. The gear cutting machine as defined in claim 2, wherein each of the spur gears are formed of one-piece with a respective associated bevel gear.

5. The gear cutting machine as defined in claim 1, wherein the bevel gears of a pair of bevel gears possess the same gear parameters as the bevel gears of the other pair of bevel gears.

6. The gear cutting machine as defined in claim 1, wherein the bevel gears of one pair of bevel gears possess the same gear parameters.

* * * * *